(12) United States Patent
Park et al.

(10) Patent No.: US 7,808,608 B2
(45) Date of Patent: Oct. 5, 2010

(54) LIQUID CRYSTAL DISPLAY DEVICE

(75) Inventors: Kwang Soon Park, Daegu-si (KR); Soo Young Yoon, Goyang-si (KR); Min Doo Chun, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 386 days.

(21) Appl. No.: 11/446,572

(22) Filed: Jun. 2, 2006

(65) Prior Publication Data
US 2006/0279687 A1    Dec. 14, 2006

(30) Foreign Application Priority Data
Jun. 2, 2005    (KR) .................... 10-2005-0046991

(51) Int. Cl.
G02F 1/1337    (2006.01)
G02F 1/1333    (2006.01)
G02F 1/1345    (2006.01)

(52) U.S. Cl. .................. 349/191; 349/110; 349/152

(58) Field of Classification Search ........... 349/149, 349/106, 151, 152, 191, 110
See application file for complete search history.

(56) References Cited

U.S. PATENT DOCUMENTS

| | | | | |
|---|---|---|---|---|
| 5,361,150 | A * | 11/1994 | Noguchi .................. | 349/84 |
| 5,768,107 | A * | 6/1998 | Ouchi et al. ............. | 361/792 |
| 5,771,085 | A * | 6/1998 | Ochi et al. ............... | 349/158 |
| 5,936,695 | A | 8/1999 | Hida et al. | |
| 6,307,613 | B1 * | 10/2001 | Iida ........................ | 349/158 |
| 6,734,931 | B2 * | 5/2004 | Yu .......................... | 349/106 |
| 7,388,626 | B2 * | 6/2008 | Wu et al. ................. | 349/54 |
| 2001/0022637 | A1 | 9/2001 | Yu | |
| 2002/0008832 | A1 * | 1/2002 | Hasegawa et al. ........ | 349/151 |
| 2008/0186441 | A1 * | 8/2008 | Ohgiichi et al. .......... | 349/151 |

FOREIGN PATENT DOCUMENTS

| | | |
|---|---|---|
| JP | 08-006005 | 1/1996 |
| JP | 08-062597 | 3/1996 |
| JP | 10-123549 | 5/1998 |
| JP | 11-095231 | 4/1999 |
| JP | 2000-147538 | 5/2000 |
| JP | 2003-084121 | 3/2003 |

OTHER PUBLICATIONS

First Office Action for corresponding Chinese Patent Application Serial No. 2006100885570, dated Nov. 7, 2008.
Office Action issued in corresponding Japanese Patent Application No. 2006-154218; issued Feb. 1, 2010.

* cited by examiner

*Primary Examiner*—Rhonda S Peace
(74) *Attorney, Agent, or Firm*—Brinks Hofer Gilson & Lione

(57) ABSTRACT

Disclosed herein is an LCD device having a drive area directly formed inside a non-pixel area of a substrate without an additional drive IC. The LCD device includes a first substrate having a pixel area and a non-pixel area disposed peripherally to the pixel area. The pixel area has a thin film transistor and a pixel electrode in each sub-pixel defined by gate and data lines crossing each other. A second substrate formed in opposition to the first substrate includes a color filter layer and a black matrix layer. A liquid crystal layer is formed between the first and second substrates. An opening in the black matrix layer reveals an alignment mark, which is disposed on at least one of the first substrate and the second substrate.

19 Claims, 8 Drawing Sheets

LIQUID CRYSTAL DISPLAY DEVICE

This application claims the benefit of the Korean Patent Application No. P2005-46991, filed on Jun. 2, 2005, which is hereby incorporated by reference as if fully set forth herein.

TECHNICAL FIELD

The present disclosure relates to a liquid crystal display (LCD) device, and more particularly, to an LCD device which has a drive area formed on a non-pixel area of a substrate without an additional drive IC.

BACKGROUND

Among flat display devices, liquid crystal display (LCD) devices are widely used for notebook computers, monitors, aircraft, and other applications. LCDs have the advantages of high contrast ratio, good gray scale level, low power consumption, and good motion quality.

In particular, LCD technology may be applied to ultra-thin displays, such as wall-mountable televisions, because the LCD device has a thin profile. In addition, the LCD device is light in weight and has low power consumption; thus it may be used as a display device for a notebook computer which is driven by a battery. Also, the LCD device can be fabricated in a small size and used for a display of a mobile phone.

Generally, the LCD device includes an upper substrate of a color filter array substrate, a lower substrate of a thin film transistor array substrate, and a liquid crystal layer of a dielectric anisotropy. In this case, the lower and upper substrates are positioned in opposition to each other, and the liquid crystal layer is formed between the lower and upper substrates. A plurality of pixels are formed, each of which has a thin film transistor TFT. A voltage is applied to the corresponding pixel through a pixel-selection address line by switching the thin film transistor of the pixel region.

A light source (backlight) is provided to a rear surface of the LCD device. That is, the LCD device is formed in a transmitting mode, wherein the light emitted from the backlight is used to display images on a screen. In this case, a color filter layer of red (R), green (G) and blue (B) colors is provided to the LCD device.

The LCD device may also be used for a desktop monitor as well as for a notebook computer, in which case the color filter layer of the LCD device preferably has high luminosity and chromaticity.

Hereinafter, an LCD device according to the related art will be described with reference to the accompanying drawings.

FIG. 1 is a plan view of a general LCD device. FIG. 2 is a plan view of an LCD device according to the related art.

As shown in FIG. 1, a general LCD device includes a TFT array substrate 50 which is divided into a pixel area 52 for displaying images inside a dotted line of FIG. 1, and a non-pixel area 54 outside the dotted line of FIG. 1.

In the pixel area 52, there are a plurality of gate and data lines 61 and 62 crossing each other to define sub-pixels. Also, a thin film transistor TFT (not shown) is formed adjacent to a crossing of the gate and data lines 61 and 62. Each sub-pixel has a pixel electrode (not shown) which is electrically connected with a drain electrode of the thin film transistor. The images are displayed by switching the corresponding thin film transistor.

The non-pixel area 54 is provided with gate and data link lines 63 and 64 respectively extended from the gate and data lines 61 and 62. Each one end of the gate link lines 63 is connected with a gate drive IC 70, and each one end of the data link lines 64 is connected with a data drive IC 80.

The gate and data drive IC 70 and 80 are mounted by a tape automated bonding (TAB) method for connection with a printed circuit board (PCB) 90. On the PCB 90, there are a plurality of elements such as integrated circuits to generate various control signals and data signals for operation of the LCD device.

Although not shown, the color filter array substrate of the LCD device includes a color filter layer of red (R), green (G) and blue (B) color filter patterns, a black matrix layer for division of R, G and B color filter patterns and for light-shielding function, and a common electrode to apply a voltage to the liquid crystal cells.

After cutting the LCD device to a desired size, processes for edge grinding and polarizer attachment are performed. For the edge grinding process, the position of the LCD device is sensed by a charged-couple device (CCD) camera, and then a grinder grinds the edge of the LCD device. For the polarizer attachment process, after sensing the position of the LCD device with the CCD camera, a polarizer is attached to the LCD device.

To sense the precise position of the LCD device, the CCD camera may benefit from having an alignment mark. The alignment mark is formed corresponding to the region where the data and gate drive ICs is formed prior to the processes of edge grinding and polarizer attachment. For reference, the data and gate drive IC are connected with the LCD device after the processes of edge grinding and polarizer attachment.

Recently, a new model has been proposed, wherein the gate drive area is formed on the TFT array substrate and the space for mounting the gate drive IC is eliminated from the LCD device, thereby increasing the pixel area of the LCD device. In this case, the alignment mark may be hidden by the black matrix layer of the color filter array substrate.

In detail, as shown in FIG. 2, a PCB 190 is provided only corresponding to a data line part, and the PCB 190 is connected with a data drive IC 180. In this state, a gate drive area 170 is formed inside a non-pixel area 154 of the LCD device without the gate drive IC, thereby decreasing the non-pixel area in size corresponding to the region where the gate drive IC would be attached. Thus, an alignment mark corresponding to a related art gate drive IC is formed in the gate drive area 170.

In case of the LCD device having no gate drive IC, the space for mounting the gate drive IC is eliminated. That is, the alignment mark is hidden in the processes for edge grinding and polarizer attachment. In other words, the gate drive area 170 is overlapped with a color filter array substrate having a black matrix layer, and thus the alignment mark is hidden by the black matrix layer.

In the general LCD device, the alignment mark is formed in the portions including the gate and data drive ICs and having no black matrix layer so that it can be seen in the edge grinding and polarizer attachment processes, and therefore, such processes are performed without any problem. However, in case of the LCD device having no gate drive IC, the alignment mark formed in the TFT array substrate is hidden by the color filter array substrate, so that the CCD camera cannot sense the alignment mark. That is, the alignment mark is hidden by the black matrix layer formed at the edge of the color filter array substrate.

SUMMARY

Accordingly, the present disclosure is directed to an LCD device which has a drive area formed on a non-pixel area of a substrate without an additional drive IC.

According to one embodiment, the LCD device comprises a first substrate including a pixel area and a non-pixel area disposed peripherally to the pixel area. The pixel area has a thin film transistor and a pixel electrode in each sub-pixel defined by gate and data lines crossing each other. A second substrate is disposed in opposition to the first substrate and includes a color filter layer and a black matrix layer. A liquid crystal layer is disposed between the first and second substrates. An alignment mark is disposed on at least one of the first substrate and the second substrate. An opening in the black matrix layer reveals the alignment mark.

According to another embodiment, the LCD device includes a first substrate having a pixel area and a non-pixel area disposed peripherally to the pixel area. The pixel area has a thin film transistor and a pixel electrode in each sub-pixel defined by gate and data lines crossing each other. A second substrate is disposed in opposition to the first substrate and includes a color filter layer and a black matrix layer. A liquid crystal layer is disposed between the first and second substrates. An alignment mark is disposed on the first substrate and is visible through an opening in the black matrix layer.

According to another embodiment, the LCD device includes a first substrate having a pixel area and a non-pixel area disposed peripherally to the pixel area. The pixel area has a thin film transistor and a pixel electrode in each sub-pixel defined by gate and data lines crossing each other. A second substrate is disposed in opposition to the first substrate and includes a color filter layer and a black matrix layer. A liquid crystal layer is disposed between the first and second substrates. An alignment mark is disposed on one of the first substrate and the second substrate and is defined by an opening in the black matrix layer.

DETAILED DESCRIPTION

Reference will now be made in detail to various preferred embodiments, examples of which are illustrated in the accompanying drawings. Wherever possible, the same reference numbers will be used throughout the drawings to refer to the same or like parts.

Figure 1:
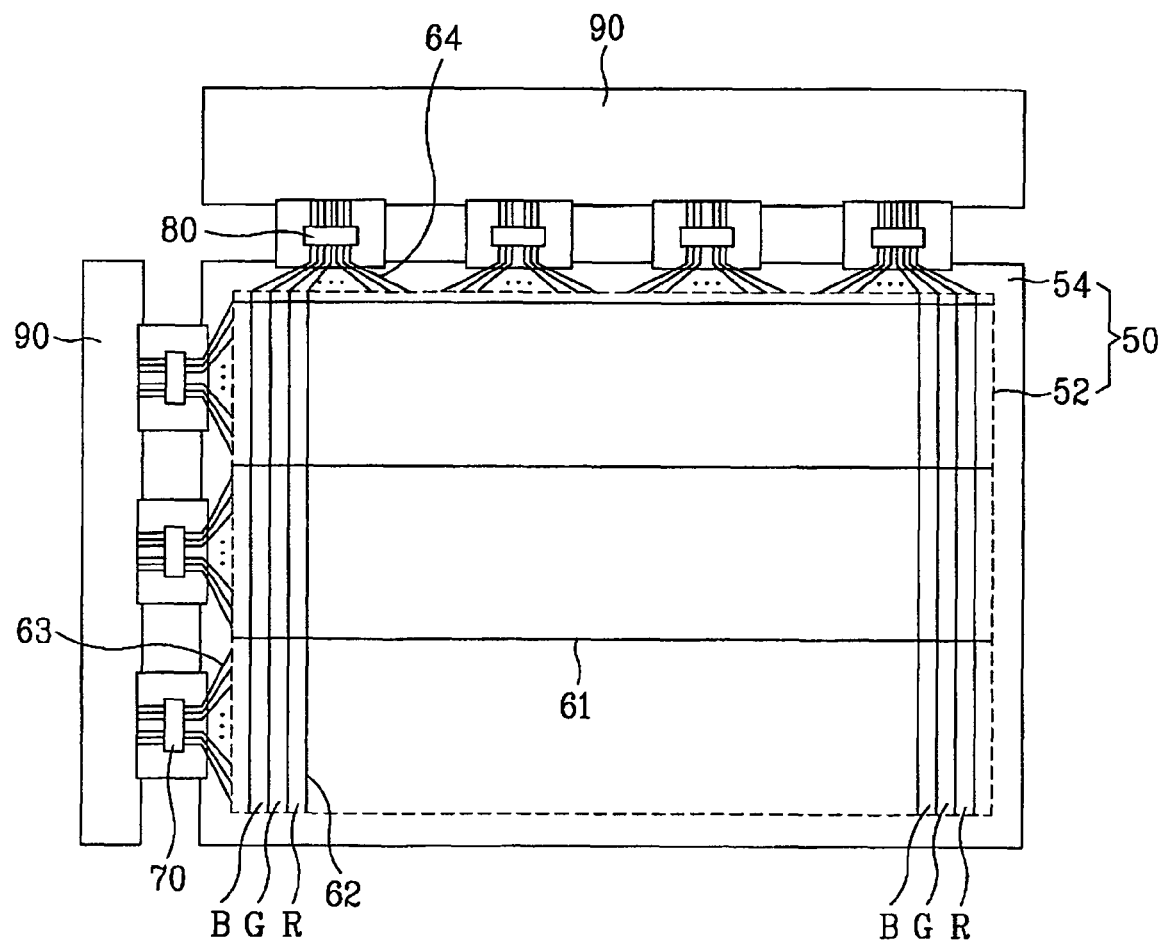
FIG. 1 is a plan view of a general LCD device.
Figure 2:
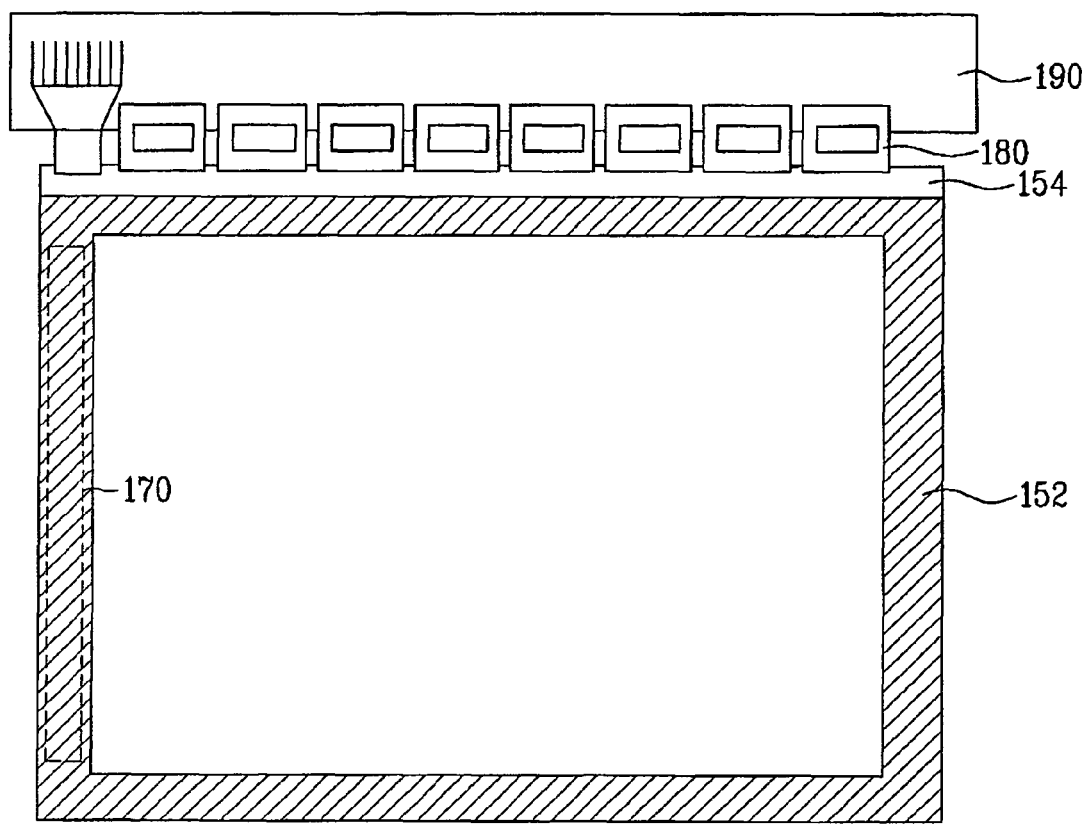
FIG. 2 is a plan view of an LCD device according to the related art.
Figure 3:
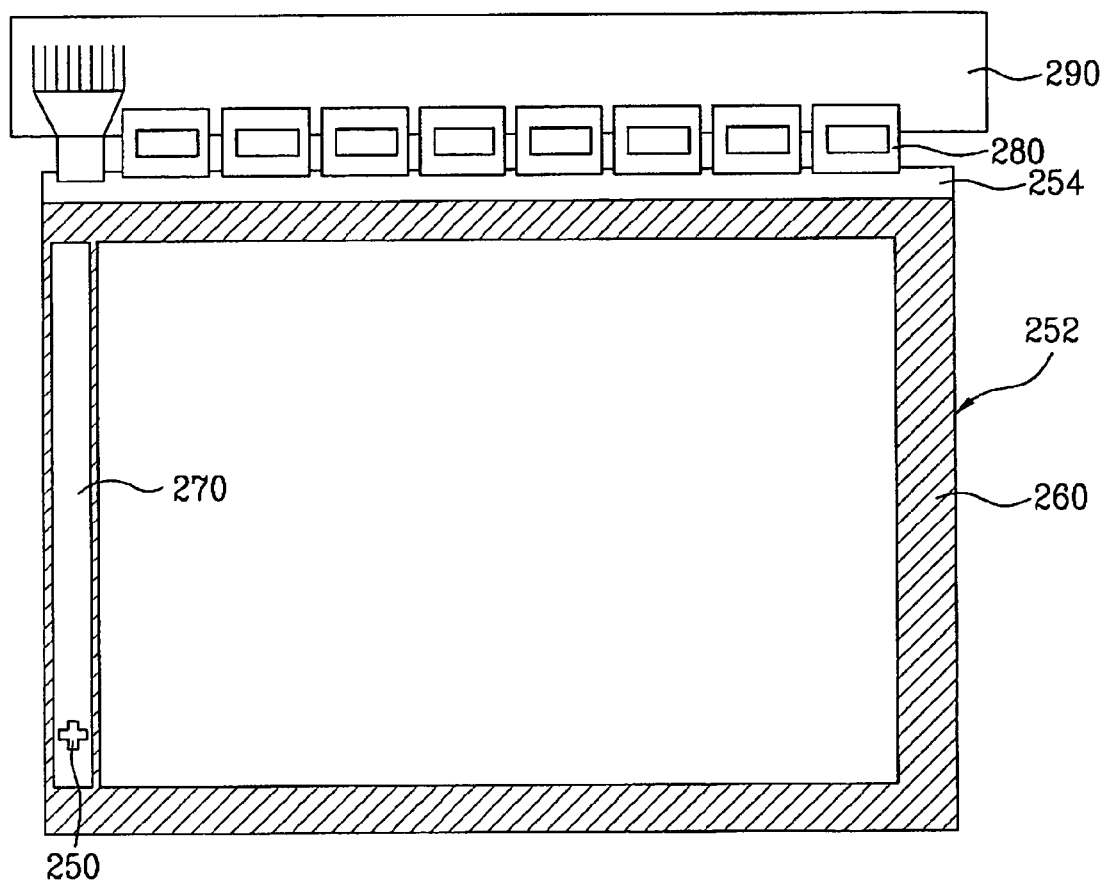
FIG. 3 is a plan view of an LCD device according to the present disclosure.
Figure 4A:
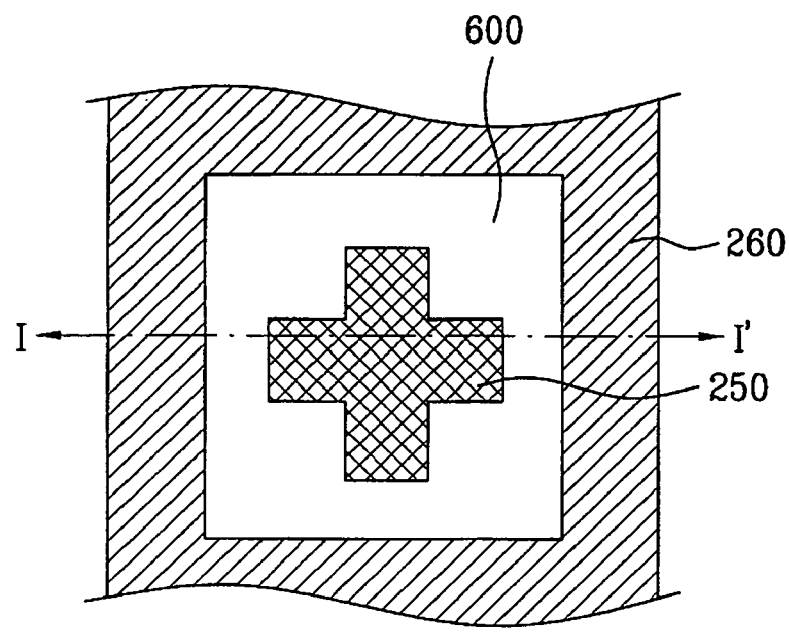
FIGS. 4A and 4B are plan and cross section views of an alignment mark according to a first embodiment.
Figure 4B:
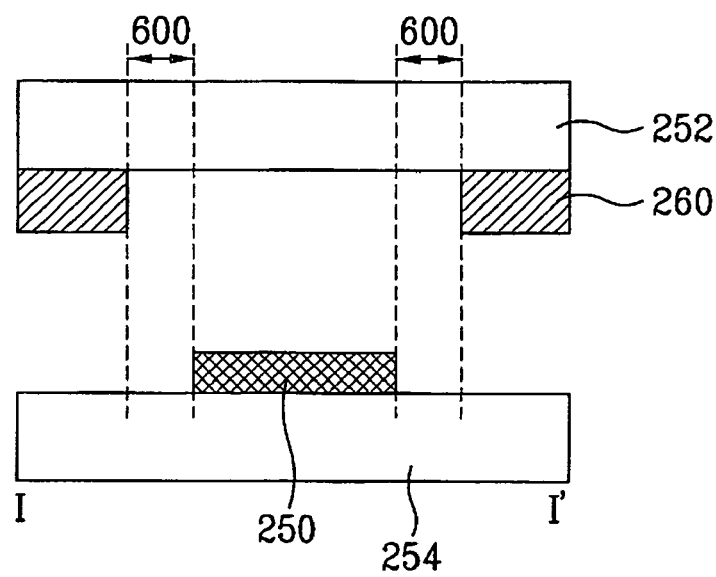
Figure 5A:
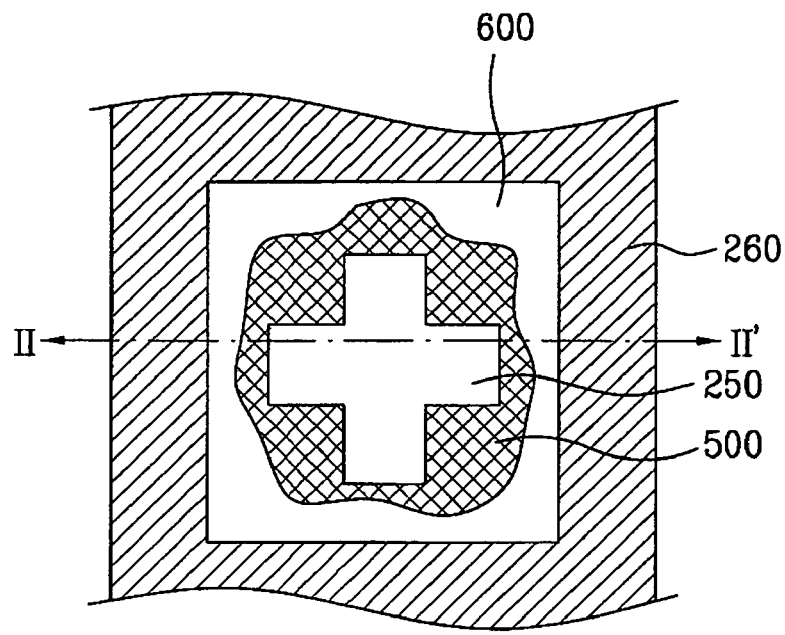
FIGS. 5A and 5B are plan and cross section views of an alignment mark according to a second embodiment.
Figure 5B:
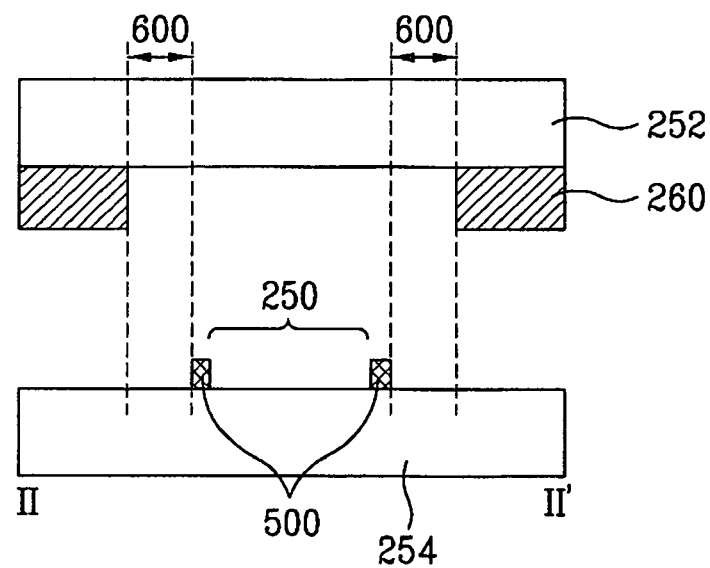
Figure 6A:
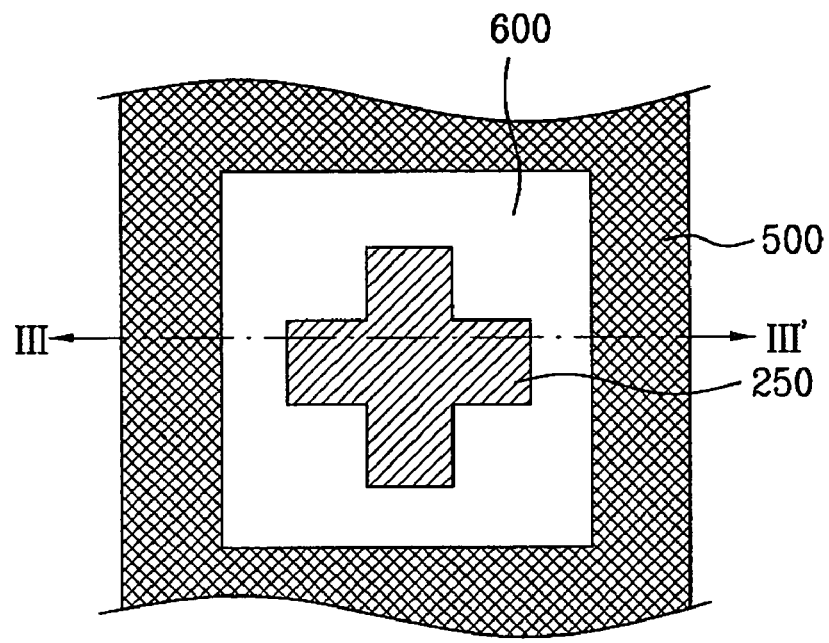
FIGS. 6A and 6B are plan and cross section views of an alignment mark according to a third embodiment.
Figure 6B:
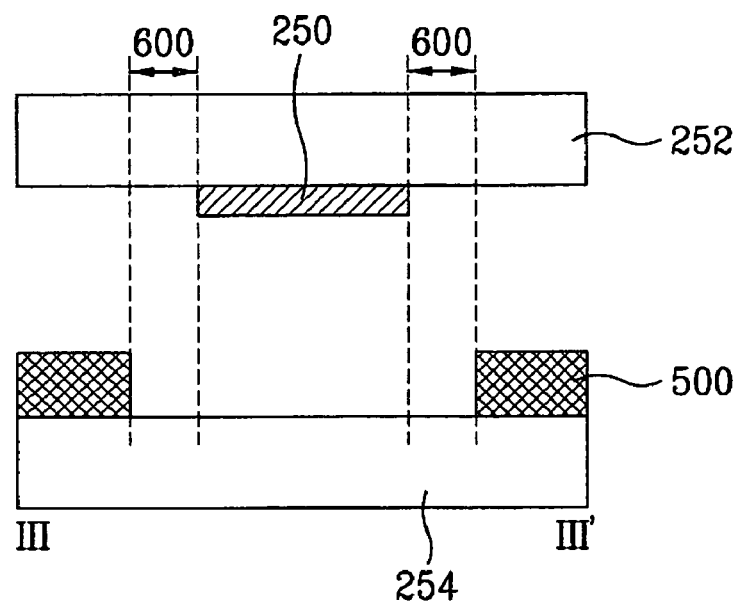
Figure 7A:
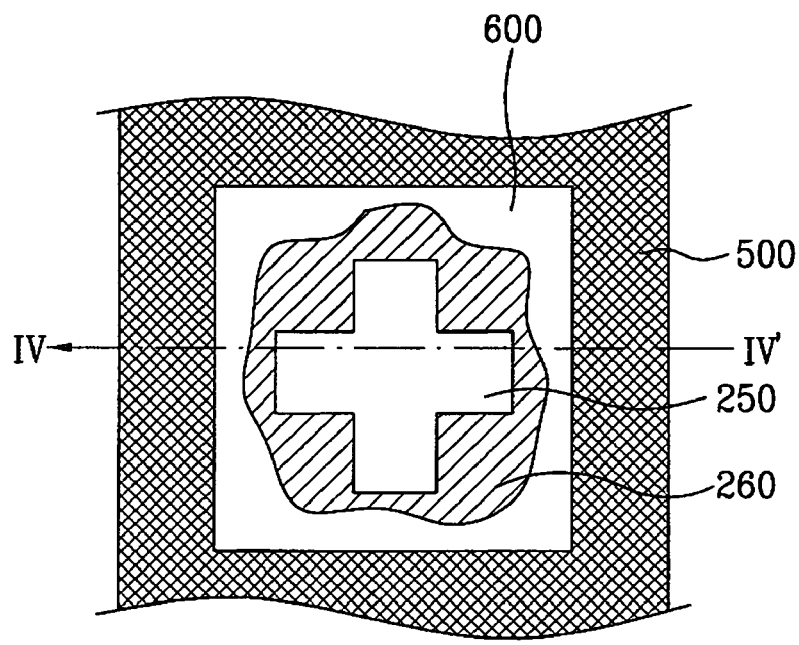
FIGS. 7A and 7B are plan and cross section views of an alignment mark according to the fourth embodiment embodiment.
Figure 7B:
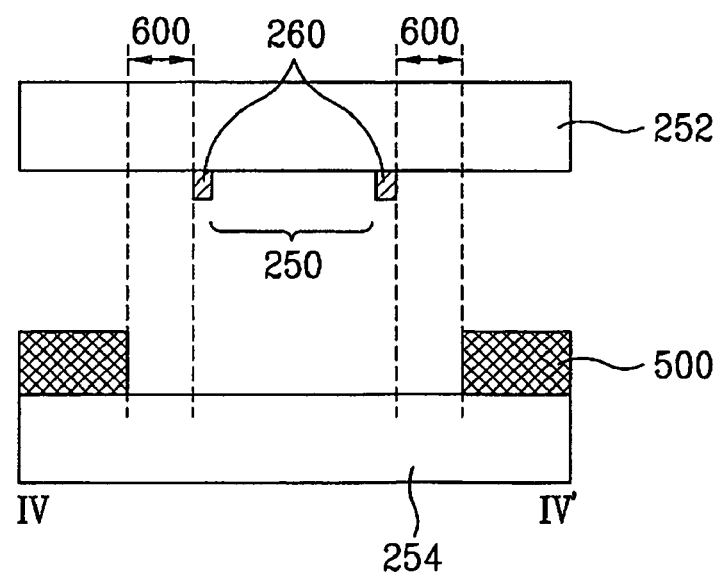
Figure 8A:
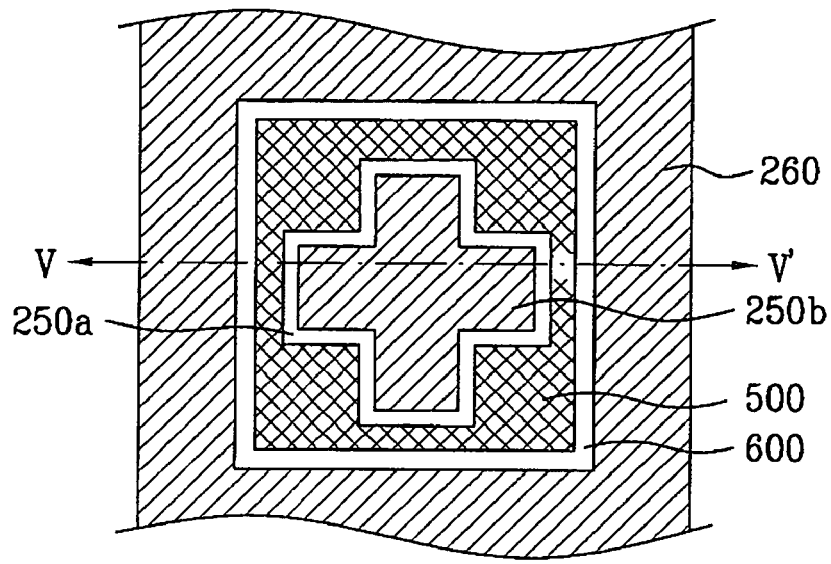
FIGS. 8A and 8B are plan and cross section views of an alignment mark according to the fifth embodiment embodiment.
Figure 8B:
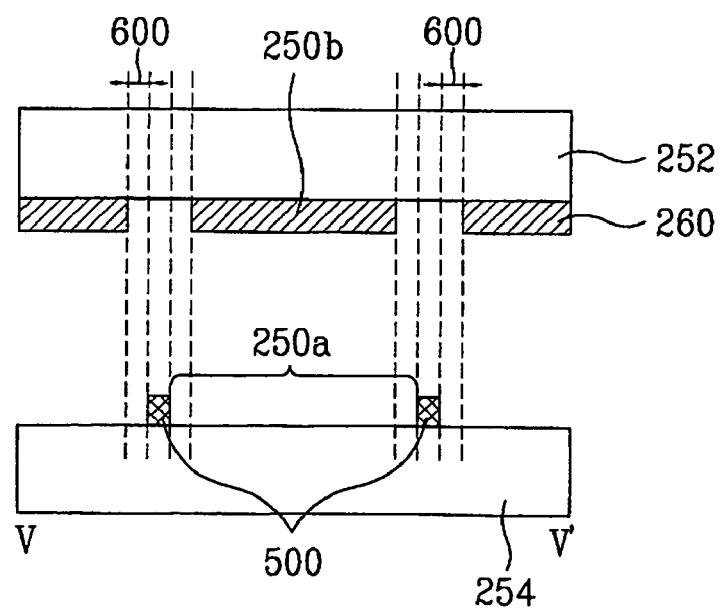

FIG. 3 is a plan view of an LCD device according to the present disclosure. FIGS. 4A and 4B are plan views of an alignment mark according to a first embodiment. FIGS. 5A and 5B are plan views of an alignment mark according to a second embodiment. FIGS. 6A and 6B are plan and cross section views of an alignment mark according to a third embodiment. FIGS. 7A and 7B are plan and cross section views of an alignment mark according to a fourth embodiment. FIGS. 8A and 8B are plan and cross section views of an alignment mark according to a fifth embodiment.

As shown in FIG. 3, an LCD device according to the present disclosure includes a TFT array substrate 254, a color filter array substrate 252, a liquid crystal layer (not shown), and an alignment mark 250.

The TFT array substrate 254 includes a pixel area for displaying images and a non-pixel area for supplying various signals to the pixel area. The pixel area is provided with switching elements to change an alignment direction of the liquid crystals. The color filter array substrate 252 is comprised of a color filter layer for representing colors, and a black matrix layer 260 for preventing light leakage. Also, the liquid crystal layer (not shown) is formed between the color filter array substrate and the TFT array substrate. Then, a portion of the black matrix layer 260 may be removed to form an opening therein that reveals the alignment mark 250, which may aid in determining the precise position of the LCD device in the steps of edge grinding and polarizer attachment. As used herein, the term "reveals" means makes visible or defines.

Although not shown, the pixel area of the TFT array substrate 254 is provided with a plurality of gate and data lines crossing each other to define sub-pixels, with a gate insulating layer disposed between the gate and data lines. A plurality of thin film transistors TFTs are formed adjacent to the crossings of the gate and data lines, and a pixel electrode is electrically connected with each thin film transistor TFT and formed in an opening of each sub-pixel.

The non-pixel area is provided with a gate drive area 270 directly formed on the TFT array substrate 250, and a data drive IC 280 connected with the data line by a data link line extended from the data line. The data drive IC 280 is connected with a PCB 290. That is, the PCB 290 is formed corresponding to a data line part, and the PCB 290 is connected with the data drive IC 280. However, the gate drive area 270 may be directly formed in the non-pixel area of the LCD device without forming an additional gate drive IC.

The gate and data lines may be formed of a light-shielding material, for example, copper (Cu), aluminum (Al), aluminum neodymium (AlNd), molybdenum (Mo), chrome (Cr), titanium (Ti), tantalum (Ta), or molybdenum-tungsten (MoW).

Also, the alignment mark 250 may be formed when forming the gate or data line, together. As shown in FIGS. 4A, 4B, 5A and 5B, a portion of the black matrix layer 260 overlapped with the alignment mark 250 may be removed, thereby forming an opening in the black matrix layer 260 and preventing the alignment mark 250 from being hidden by the black matrix layer 260. The opening in the black matrix layer 260 thus reveals the alignment mark 250 when viewed from a plan view perspective, as shown in the figures. As used herein, the term "reveals" means makes visible or defines. As shown in FIGS. 4A and 4B, the alignment mark 250 may be formed on the TFT array substrate 254 by patterning the light-shielding material layer. The alignment mark 250 shown in FIGS. 4A and 4B has a relief structure. Also, as shown in FIGS. 5A and 5B, the alignment mark 250 may be formed on the TFT array substrate 254 having an intaglio structure by removing a portion of the light-shielding metal layer 500. The two substrates 252 and 254 may be aligned to show the alignment mark through the opening in the black matrix layer 260. For reference, the reference numeral 600 corresponds to a portion having no pattern between the black matrix layer 260 and the alignment mark 250.

The color filter array substrate 252 includes a color filter layer, a black matrix layer 260, and a common electrode. The color filter layer is disposed in opposition to the pixel area so as to represent colors, the black matrix layer 260 is disposed in opposition to the periphery of the sub-pixels and the non-pixel area so as to prevent light leakage, and a common electrode is disposed in opposition to the pixel electrode so as to apply an electric field to the liquid crystal layer.

The black matrix layer 260 is formed by depositing or coating a material having an optical density of 3.5 or above, for example, an inorganic material of chrome oxide (CrOx) or a metallic material of chrome (Cr). The alignment mark 250 may be formed when forming the black matrix layer, together. As shown in FIGS. 6A, 6B, 7A and 7B, one or more portions of the black matrix layer 260 may be removed to form an opening therein that reveals the alignment mark from a plan view perspective. As used herein, the term "reveals" means makes visible or defines.

As shown in FIGS. 6A and 6B, the alignment mark 250 may be formed to have a relief structure on the color filter array substrate 252 by patterning the black matrix layer 260. Also, as shown in FIGS. 7A and 7B, the alignment mark 250 may be formed on the color filter array substrate 252 having an intaglio structure by patterning the black matrix layer 260. The two substrates 252 and 254 may be aligned to show the alignment mark 250 revealed by the opening in the black matrix layer 260. For reference, the reference numeral 600 corresponds to a portion having no pattern between the black matrix layer 260 and the alignment mark 250.

As shown in FIGS. 8A and 8B, the alignment mark may include a first alignment mark 250a formed on a TFT array substrate, and a second alignment mark 250b formed on a color filter array substrate. For example, the second alignment mark 250b having a relief structure may be positioned inside the first alignment mark 250a having an intaglio structure. Alternatively, the second alignment mark 250b having a relief structure may be positioned inside the first alignment mark 250a having a relief structure. The first alignment mark 250a may be formed at the same time as the light-shielding metal layer 500 for the gate or data line, and the second alignment mark 250b may be formed at the same time as the black matrix layer. The two substrates 252 and 254 may be aligned to show the second alignment mark 250b within the first alignment mark 250a. For reference, the reference numeral 600 corresponds to portions having no pattern, for example, between the light-shielding material layer 500 and the second alignment mark 250b, and between the light shielding material layer 500 and the black matrix layer 260.

Alternatively, the first alignment mark having a relief or an intaglio structure may be positioned inside the second alignment mark having an intaglio or a relief structure.

In this case, the first and second alignment marks may be used when bonding the TFT array substrate and the color filter array substrate to each other in addition to the edge grinding and polarizer attachment processes.

The alignment mark may be formed at the same time as the gate or data line of the TFT array substrate. Alternatively, the alignment mark may be formed at the same time as the black matrix layer of the color filter array substrate.

Also, the alignment mark may be comprised of the first alignment mark on the TFT array substrate formed at the same time as the gate or data line, and the second alignment mark on the color filter array substrate formed at the same time as the black matrix layer. Also, the alignment mark may be comprised of the first alignment mark on the TFT array substrate formed at the same time as the black matrix layer, and the second alignment mark on the color filter array substrate formed at the same time as the black matrix layer.

In the LCD device having the drive area directly formed on the substrate, the black matrix layer may be partially removed to form an opening that reveals the alignment mark, which may aid in determining the correct and precise position of the LCD device in the steps of edge grinding and polarizer attachment.

In the above drawings, the alignment mark is formed in the shape of a cross. However, it is not limited to the cross shape.

A data drive area as well as the gate drive area may be directly formed inside the non-pixel area of the TFT array substrate, thereby removing the data drive IC. In this case, a portion of the black matrix layer covering the data drive area may be removed, forming an opening in the black matrix layer over the drive area and preventing the alignment mark from being hidden by the black matrix layer. Accordingly, it may be possible to sense the correct and precise position of the LCD device in the steps of substrate bonding, edge grinding, and polarizer attachment.

In the LCD device having the drive area directly formed inside the non-pixel area of the substrate, a portion of the black matrix layer covering the drive area of the non-pixel area may be removed to form an opening in the black matrix layer that reveals the alignment mark. Accordingly, it may be possible to sense the correct and precise position of the LCD device in the steps of edge grinding and polarizer attachment.

Also, the alignment mark may be formed at the same time as the gate or data line of the TFT array substrate, or as the black matrix layer of the color filter array substrate. Thus, the alignment mark may be formed without an additional step.

It will be apparent to those skilled in the art that various modifications and variations can be made in the present disclosure without departing from the spirit or scope of the invention. Thus, it is intended that the present disclosure covers the modifications and variations of this invention provided they come within the scope of the appended claims and their equivalents.

What is claimed is:

1. An LCD device comprising:
   a first substrate comprising a pixel area and a non-pixel area disposed peripherally to the pixel area, the pixel area having a thin film transistor and a pixel electrode in each sub-pixel defined by gate and data lines crossing each other;
   a second substrate having a color filter layer and a black matrix layer, the second substrate disposed in opposition to the first substrate;
   a liquid crystal layer disposed between the first and second substrates; and
   an alignment mark disposed on at least one of the first substrate and the second substrate, wherein the alignment mark and black matrix layer are positioned in the non-pixel area;
   wherein an entire body of the alignment mark is positioned within a hole of the black matrix layer such that the entire body of the alignment mark is exposed through the hole of the black matrix layer;
   wherein the alignment mark is completely enclosed by a inner wall of the hole which goes through the black matrix
   wherein the non-pixel area has a gate drive area connected with the gate lines, and the hole in the black matrix layer reveals the alignment mark and the gate drive area;

wherein the alignment mark is positioned within the gate driver area;

wherein size of the gate driver area is same as the size of the hole.

2. The LCD device of claim 1, wherein the alignment mark comprises a portion of the alignment mark formed on the first substrate.

3. The LCD device of claim 2, wherein the alignment mark is formed at the same time as the gate line.

4. The LCD device of claim 2, wherein the alignment mark is formed at the same time as the data line.

5. The LCD device of claim 2, wherein the alignment mark is formed at the same time as the black matrix layer.

6. The LCD device of claim 1, wherein the alignment mark comprises a portion of the alignment mark formed on the second substrate.

7. The LCD device of claim 6, wherein the alignment mark is formed at the same time as the black matrix layer.

8. The LCD device of claim 1, wherein the alignment mark comprises one of an intaglio structure and a relief structure.

9. The LCD device of claim 1, wherein the alignment mark comprises a portion of the alignment mark formed on the first substrate and a portion of the alignment mark formed on the second substrate.

10. The LCD device of claim 9, wherein the portion of the alignment mark formed on the first substrate is formed at the same time as the gate line.

11. The LCD device of claim 9, wherein the portion of the alignment mark formed on the first substrate is formed at the same time as the data line.

12. The LCD device of claim 9, wherein the portion of the alignment mark formed on the first substrate is formed at the same time as the black matrix.

13. The LCD device of claim 9, wherein the portion of the alignment mark formed on the first substrate is formed at the same time as the black matrix layer.

14. The LCD device of claim 9, wherein portion of the alignment mark formed on the first substrate comprises one of a first intaglio structure and a first relief structure and the portion of the alignment mark formed on the second substrate comprises one of a second relief structure and a second intaglio structure.

15. The LCD device of claim 9, wherein the portion of the alignment mark formed on the second substrate is positioned inside the first substrate portion.

16. The LCD device of claim 9, wherein the portion of the alignment mark formed on the first substrate is positioned inside the second substrate portion.

17. The LCD device of claim 1, wherein the black matrix layer is disposed over the non-pixel area except a portion including the alignment mark.

18. An LCD device comprising:
a first substrate comprising a pixel area and a non-pixel area disposed peripherally to the pixel area, the pixel area having a thin film transistor and a pixel electrode in each sub-pixel defined by gate and data lines crossing each other;
a second substrate having a color filter layer and a black matrix layer, the second substrate disposed in opposition to the first substrate;
a liquid crystal layer disposed between the first and second substrates; and
an alignment mark disposed on the first substrate visible through a hole in the black matrix layer, wherein the alignment mark and black matrix layer are positioned in the non-pixel area;
wherein an entire body of the alignment mark is positioned within the hole of the black matrix layer such that the entire body of the alignment mark is exposed through the hole of the black matrix layer;
wherein the alignment mark is completely enclosed by a inner wall of the hole which goes through the black matrix:
wherein the non-pixel area has a gate drive area connected with the gate lines, and the hole in the black matrix layer reveals the alignment mark and the gate drive area;
wherein the alignment mark is positioned within the gate driver area;
wherein size of the gate driver area is same as the size of the hole.

19. An LCD device comprising:
a first substrate comprising a pixel area and a non-pixel area disposed peripherally to the pixel area, the pixel area having a thin film transistor and a pixel electrode in each sub-pixel defined by gate and data lines crossing each other;
a second substrate having a color filter layer and a black matrix layer, the second substrate disposed in opposition to the first substrate;
a liquid crystal layer disposed between the first and second substrates; and
an alignment mark disposed on one of the first substrate and the second substrate defined by a hole in the black matrix layer, wherein the alignment mark and black matrix layer are positioned in the non-pixel area;
wherein an entire body of the alignment mark is positioned within the hole of the black matrix layer such that the entire body of the alignment mark is exposed through the opening of the black matrix layer;
wherein the alignment mark is completely enclosed by a inner wall of the hole which goes through the black matrix;
wherein the non-pixel area has a gate drive area connected with the gate lines, and the hole in the black matrix layer reveals the alignment mark and the gate drive area;
wherein the alignment mark is positioned within the gate driver area;
wherein size of the gate driver area is same as the size of the hole.

* * * * *